(12) United States Patent
Tronc et al.

(10) Patent No.: US 8,741,408 B2
(45) Date of Patent: Jun. 3, 2014

(54) FLEXIBLE UNDERWATER PIPE INCLUDING A LAYER INCLUDING A POLYMER RESIN INCLUDING A POLYHEDRAL OLIGOMERIC SILSESQUIOXANE

(75) Inventors: Frédéric Tronc, Rouen (FR); Alain Coutarel, Mont Saint Aignan (FR)

(73) Assignee: Technip France (FR)

( * ) Notice: Subject to any disclaimer, the term of this patent is extended or adjusted under 35 U.S.C. 154(b) by 79 days.

(21) Appl. No.: 13/517,476

(22) PCT Filed: Dec. 21, 2010

(86) PCT No.: PCT/FR2010/052846
§ 371 (c)(1),
(2), (4) Date: Jul. 23, 2012

(87) PCT Pub. No.: WO2011/083251
PCT Pub. Date: Jul. 14, 2011

(65) Prior Publication Data
US 2012/0279575 A1    Nov. 8, 2012

(30) Foreign Application Priority Data

Dec. 21, 2009 (FR) .................................... 09 59291
Jun. 14, 2010 (FR) .................................... 10 54674

(51) Int. Cl.
*B29C 47/00* (2006.01)
*F16L 11/08* (2006.01)
*F16L 11/00* (2006.01)

(52) U.S. Cl.
CPC ............. *F16L 11/083* (2013.01); *F16L 11/00* (2013.01); *B32B 2597/00* (2013.01)
USPC ....... 428/36.9; 428/35.7; 264/171.1; 138/137

(58) Field of Classification Search
CPC . F16L 11/083; F16L 2011/00; B32B 2597/00
USPC .................... 428/36.9, 35.7; 138/135, 137; 264/171.1
See application file for complete search history.

(56) References Cited

U.S. PATENT DOCUMENTS

| | | | | |
|---|---|---|---|---|
| 7,445,030 | B2 * | 11/2008 | Hardy et al. ................... | 138/135 |
| 7,766,051 | B2 * | 8/2010 | Coutarel et al. ............... | 138/135 |
| 2005/0115623 | A1 * | 6/2005 | Coutarel et al. ............... | 138/135 |
| 2007/0027284 | A1 * | 2/2007 | Wei et al. ......................... | 528/26 |
| 2012/0279575 | A1 * | 11/2012 | Tronc et al. ...................... | 137/1 |
| 2013/0122763 | A1 * | 5/2013 | Fish et al. ........................ | 442/59 |
| 2013/0247996 | A1 * | 9/2013 | Tronc et al. ..................... | 137/1 |

FOREIGN PATENT DOCUMENTS

| | | |
|---|---|---|
| EP | 1 362 890 A1 | 11/2003 |
| WO | WO 91/19924 | 12/1991 |
| WO | WO 03/078134 | 9/2003 |
| WO | WO 2007/078038 | 7/2007 |
| WO | WO 2008/109863 A2 | 9/2008 |
| WO | WO 2008/113362 | 9/2008 |

OTHER PUBLICATIONS

International Search Report dated Apr. 19, 2011 issued in corresponding international patent application No. PCT/FR2010/052846.

* cited by examiner

*Primary Examiner* — N. Edwards
(74) *Attorney, Agent, or Firm* — Ostrolenk Faber LLP

(57) ABSTRACT

The disclosure relates to a flexible underwater pipe intended for transporting fluids, notably hydrocarbons, comprising at least one layer comprising a polymeric resin comprising at least one polyhedral oligomeric silsesquioxane chemically bound to the polymer.

16 Claims, 1 Drawing Sheet

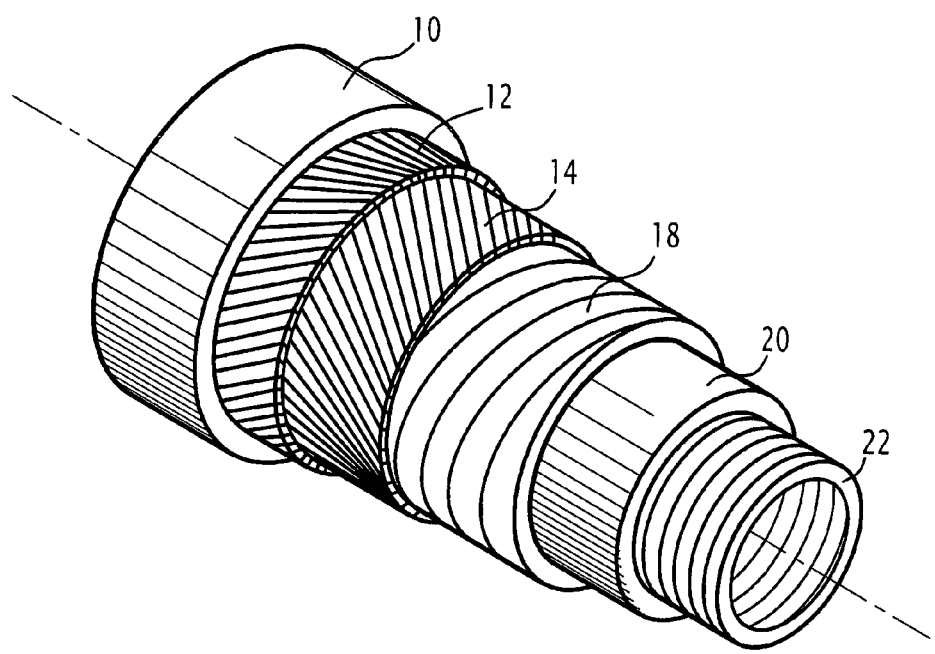

FLEXIBLE UNDERWATER PIPE INCLUDING A LAYER INCLUDING A POLYMER RESIN INCLUDING A POLYHEDRAL OLIGOMERIC SILSESQUIOXANE

CROSS REFERENCE TO RELATED APPLICATIONS

The present application is a 35 U.S.C. §371 National Phase conversion of PCT/FR2010/052846, filed Dec. 21, 2010, which claims benefit of French Application No.09 59291, filed Dec. 21, 2009 and French Application No. 10 54674, filed Jun. 14, 2010, the disclosures of which are incorporated herein by reference. The PCT International Application was published in the French language.

TECHNICAL FIELD

The present invention relates to a flexible underwater pipe intended for transporting fluid in deep water. These fluids are notably gases or liquids, preferably hydrocarbons.

BACKGROUND OF THE INVENTION

Flexible pipes for transporting hydrocarbons generally comprise from the outside to the inside of the pipe:
- an external polymeric sheath for protecting the whole of the pipe and notably for preventing seawater from penetrating into its thickness,
- tensile armor plies,
- a pressure vault,
- a internal sealing polymeric sheath, and
- optionally a metal carcass.

If the pipe comprises a metal carcass, it is said to be with a rough bore. If the pipe is without any metal carcass, it is said to be with a smooth bore. Generally, for transporting hydrocarbons, a pipe comprising a carcass is preferred while a pipe without any carcass will be suitable for transporting water and/or pressurized steam.

The metal carcass and the pressure vault consist of longitudinal elements wound with a short pitch, and they give the pipe its resistance to radial forces while the tensile armor plies consist of metal wires wound with long pitches in order to spread out axial forces.

The nature, the number, the dimensioning and the organization of the layers forming the flexible pipes are essentially related to their conditions of use and of installation. The pipes may comprise additional layers to those mentioned above.

In the present application, the notion of winding with a short pitch designates any helicoidal winding with a helix angle close to 90°, typically comprised between 75° and 90°. The notion of winding with a long pitch, as for it, covers helix angles of less than 55°, typically comprised between 25° and 55° for the armor plies.

These flexible pipes are notably suitable for transporting fluids, notably hydrocarbons in sea beds and this at great depths. More specifically, they are said to be of the unbonded type and they are thus described in the normative documents published by the American Petroleum Institute (API), API 17J and API RP 17B.

The flexible pipes may be used at great depth, typically down to 2,500 meters deep. They allow transport of fluids, notably of hydrocarbons, having a temperature attaining 130° C. typically and which may even exceed 150° C. and an internal pressure which may attain about 1,000 bars, or even 1,500 bars.

The constitutive material of the internal sealing polymeric sheath has to be chemically stable and capable of mechanically withstanding the transported fluid and its characteristics (composition, temperature and pressure). This material should combine ductility, durability (generally the pipe should have a lifetime of at least 20 years), mechanical strength, heat and pressure resistance characteristics. The materials should notably be chemically inert with regard to the chemical compounds making up the transported fluid.

Pipes comprising a sealing polymeric sheath based on polymer, notably on polyamide or polyethylene, may notably be used. However, the thermomechanical properties of polymers, notably of polyamides or polyethylenes, under the conditions of use mentioned earlier (high temperature and pressure, high acidity and presence of water) may be significantly reduced. In particular, polyamides may be degraded by hydrolysis. Further, it is difficult to use polyethylenes at temperatures above 65° C. Thus, many studies have been reported for attempting to improve these properties, in particular for improving their resistances to creep and to tension or compression. For this, the mobility of the polymer chains relatively to each other should be reduced by longer and/or more cross-linked polymer chains.

Thus, international application WO2007/078038 describes a thermoplastic resin, notably in polyamide, comprising nanoparticles of metal oxide, the surface of which is covered with silanes, allowing binding between the polyamide and the nanoparticles.

International application WO93/05086 describes a method for increasing the molecular mass of polyamides by an amidation process applying a catalyst of the phosphonic acid type in the presence of titanium dioxide comprising alumina.

International application WO2008/113362 describes a flexible pipe comprising a polymeric layer, notably based on polyamide, comprising a cationic clay, notably of the smectite type.

International application WO 03/078134 describes a flexible pipe comprising a layer based on polyethylene cross-linked with a peroxide.

International application WO 91/19924 describes a flexible pipe comprising a layer based on polyethylene cross-linked with a silane.

The mechanical properties of the modified polyamide or polyethylenes of these applications are affected. Nevertheless, these properties further have to be improved in order to allow transport of fluids under the extreme conditions mentioned above.

SUMMARY OF THE INVENTION

One of the objects of the present invention is therefore to provide a flexible underwater pipe comprising a layer based on a polymer having improved thermomechanical properties allowing its use for transporting fluids, such as hydrocarbons, notably at high pressure and at high temperature.

For this purpose, according to a first object, the object of the invention is a flexible underwater pipe intended for transporting fluids, notably hydrocarbons, comprising at least one layer comprising a polymeric resin comprising at least one polyhedral oligomeric silsesquioxane chemically bound to the polymer.

Polyhedral oligomeric silsesquioxanes (Polyhedral Oligomeric SilSesquioxane POSS) according to the invention, hereafter POSS, may be molecules with nanometric dimensions of formula $(RSiO_{1.5})_x$ wherein x represents an integer greater than or equal to 6 and less than or equal to 12, x representing the degree of polymerization, and wherein R represents a substituent, it being understood that the groups R of each $RSiO_{1.5}$ group may be either identical or different from each other, at least one group R of the POSS being able to form a chemical bond with said polymer.

The POSSes have a <<cage-shaped>> structure comprising silicon and oxygen atoms, and wherein each silicon atom bears a substituent R.

When at least one of the R groups is an organic substituent, the POSSes are organic/inorganic hybrid entities.

The groups R may be of a very diverse nature. Each group R may independently of the other groups R be:
inorganic, for example a halogen, —SH, —OH or —$NH_2$, or
organic for example:
a group —$OSi(R_7)(R_8)(R_9)$, wherein $R_7$, $R_8$ and $R_9$ independently represent OH, an alkyl, an alkoxyl or a group

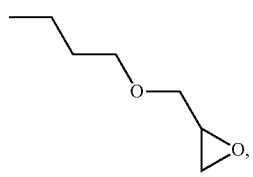

a group —$OR_{17}$, wherein $R_{17}$ represents H or an alkyl, a saturated, unsaturated (notably a vinyl group) or aromatic, linear, branched or cyclic hydrocarbon chain, optionally substituted with one or several groups, notably selected from a halogen or a group —OCOCl, —COCl, —$SO_2Cl$, —$COOR_1$, —$COR_1$, —$CR_1R_2Cl$, —$OR_1$, —$OSi(R_7)(R_8)(R_9)$, —$SR_1$, —$NR_1R_2$, —$NR_1COR_2$, —$COR_1NR_2$, —$NR_1$—CO—$NR_2R_3$, —O—CO—$NR_1$, —$NR_1$, —CO—$OR_2$, —CN, —$NO_2$, —NCO,

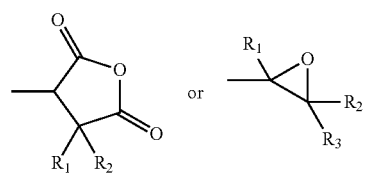

wherein $R_7$, $R_8$ and $R_9$ are as defined above and $R_1$, $R_2$ and $R_3$ represent independently H or a saturated, unsaturated or aromatic, linear, branched or cyclic hydrocarbon chain, itself optionally substituted with or several of the groups selected from a halogen or a group —OCOCl, —COCl, —$SO_2Cl$, —$COOR_4$, —$COR_4$, —$CR_4R_5Cl$, —$OR_4$, —$SR_4$, —$NR_4R_5$, $NR_4COR_5$, —$COR_4NR_5$, —$NR_4$—CO—$NR_5R_6$, —O—CO—$NR_4$, —$NR_4$—CO—$OR_5$, —CN, —$NO_2$, —NCO,

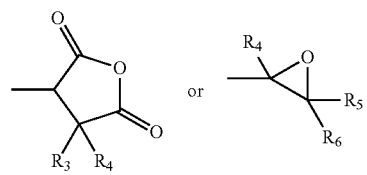

wherein $R_4$, $R_5$ and $R_6$ represent independently H or a saturated, unsaturated or aromatic, linear, branched or cyclic hydrocarbon chain, it being understood that at least one of the R groups of POSS is able to form a chemical bond with the polymer.

In the sense of the present application, a halogen is selected from fluorine, bromine, iodine and chlorine.

A hydrocarbon chain preferably comprises from 1 to 10 carbon atoms, notably from 2 to 6 carbon atoms. The preferred hydrocarbon chains are alkyl groups (preferably having from 1 to 10 carbon atoms, in particular 2 to 6 carbon atoms), alkenyl groups (preferably having from 2 to 10 carbon atoms, in particular from 2 to 6 carbon atoms), aryl groups (preferably having from 6 to 10 carbon atoms), arylalkyl groups (preferably having from 7 to 10 carbon atoms) or alkylaryl groups (preferably having from 7 to 10 carbon atoms). The vinyl group is the preferred alkenyl group, the phenyl group is the preferred aryl.

The alkyl groups preferably have from 1 to 10 carbon atoms, in particular from 2 to 6 carbon atoms. An alkoxyl group is an —O-alkyl group.

The following diagram illustrates four exemplary POSS structures suitable for the invention.

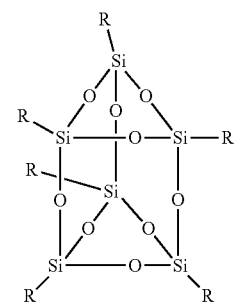

$[(RSiO_{1.5})_6]\Sigma 6$

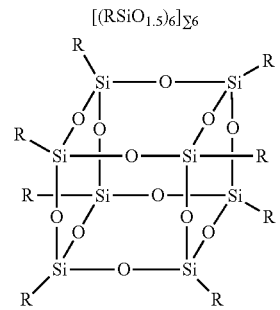

$[(RSiO_{1.5})_8]\Sigma 8$

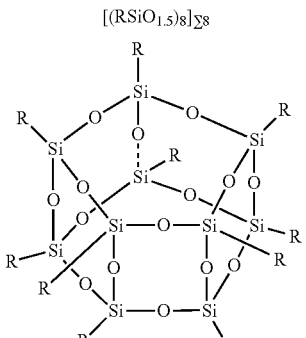

$[(RSiO_{1.5})_{10}]\Sigma 10$

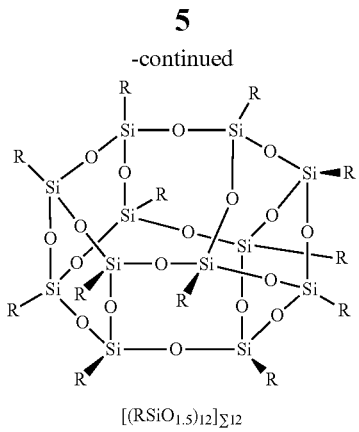

[(RSiO$_{1.5}$)$_{12}$]$_{\Sigma12}$

The definition of POSS in the sense of the application also comprises the POSSes of formula [(RSiO$_{1.5}$)$_{x'}$(XRSiO$_{1.0}$)$_{x''}$], wherein:

R is as defined above, x' and x" represent independently of each other an integer, so that the sum of x' and x" is greater than or equal to 6 and less than or equal to 12, and X represents a substituent of the silicon, the groups X of each group XRSiO$_{1.0}$ may be identical or different from each other and identical or different from the R substituents, it being understood that at least one of the R and one of the X is able to form a chemical bond with the polymer.

These compounds, illustrated in the following diagram, correspond to POSSes wherein some of the Si—O—Si functions are broken (a partly open cage) as illustrated in the diagram below. The silicon atoms located at the opening of the cage are substituted with groups R and X. The silicon atoms of the cage are substituted with groups R.

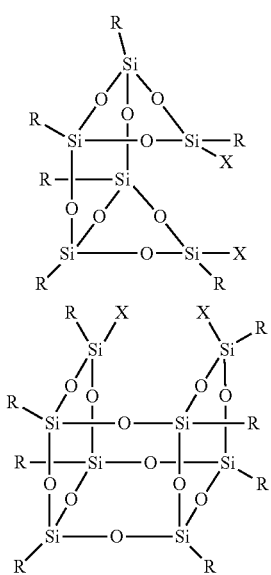

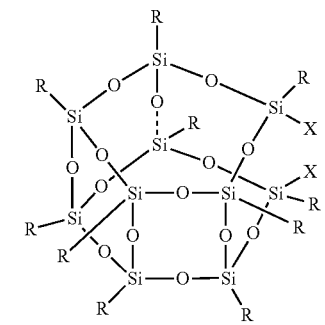

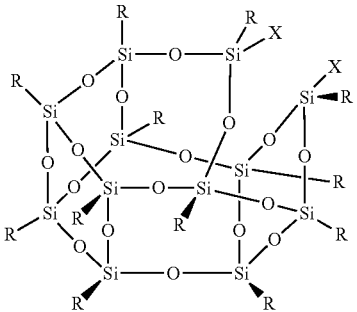

For example, the following diagram represents POSSes wherein an Si—O—Si function is in a hydrolyzed form (X represents OH).

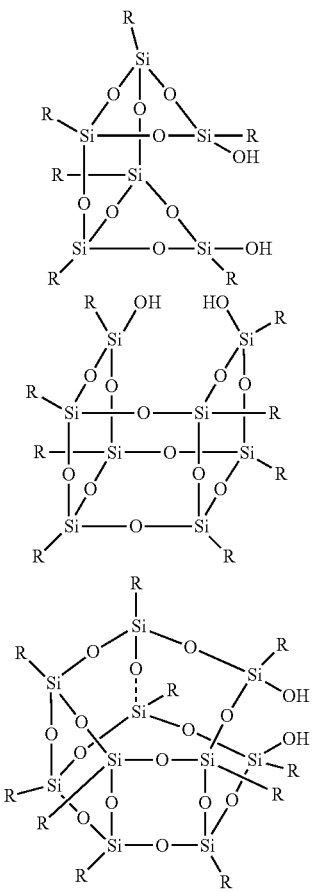

-continued

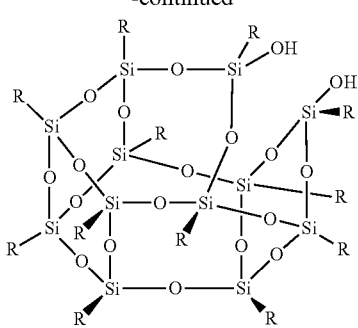

Typically, each group X may be, independently of the other groups X and groups R, a group which is:

inorganic, for example a halogen, —SH, —OH or —$NH_2$, or organic, for example:

a group —$OSi(R_7)(R_8)(R_9)$, wherein $R_7$, $R_8$ and $R_9$ represent independently OH, an alkyl, an alkoxyl or a group,

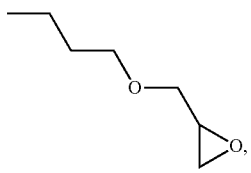

a group —$OR_{17}$, wherein $R_{17}$ represents H or an alkyl, a saturated, unsaturated (notably a vinyl group), or aromatic, linear, branched or cyclic hydrocarbon chain, optionally substituted with one or several groups, notably selected from a halogen or a group —OCOCl, —COCl, —$SO_2Cl$, —$COOR_1$, —$COR_1$, —$CR_1R_2Cl$, —$OSi(R_7)(R_8)(R_9)$, —$SR_1$, —$NR_1R_2$, —$NR_1COR_2$, —$COR_1NR_2$, —$NR_1$—CO—$NR_2R_3$, —O—CO—$NR_1$, —$NR_1$—CO—$OR_2$, —CN, —$NO_2$, —NCO,

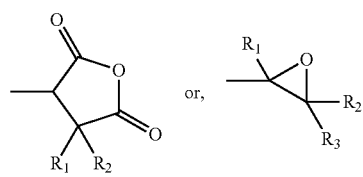

wherein $R_7$, $R_8$ and $R_9$ are as defined above and $R_1$, $R_2$ and $R_3$ represent independently H or a saturated, unsaturated or aromatic, linear, branched or cyclic hydrocarbon chain, itself optionally substituted with one or several of the groups selected from a halogen or a group —OCOCl, —COCl, —$SO_2Cl$, —$COOR_4$, —$COR_4$, —$CR_4R_5Cl$, —$SR_4$, —$NR_4R_5$, $NR_4COR_5$, —$COR_4NR_5$, —$NR_4$—CO—$NR_5R_6$, —O—CO—$NR_4$, —$NR_4$—CO—$OR_5$, —CN, —$NO_2$, —NCO,

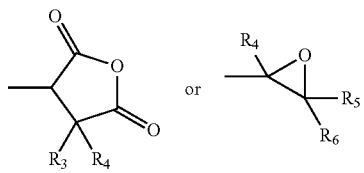

wherein $R_4$, $R_5$ and $R_6$ represent independently H or a saturated, unsaturated or aromatic, linear, branched or cyclic hydrocarbon chain.

The inventors have discovered that polyhedral oligomeric silsesquioxanes chemically bound to a polymer allow reduction in the mobility of the polymer chains relatively to each other and therefore improvement in the thermomechanical properties of the polymer, in particular improvement in its resistance to creep and to tension or compression.

By a polyhedral oligomeric silsesquioxane <<chemically bound>> to the polymer, is meant that the polyhedral oligomeric silsesquioxane comprises at least one group capable of forming a chemical bond with the polymer. By <<group capable of forming a chemical bond>> is meant any atom, function capable of forming a chemical bond or any group bearing such an atom or such a function. The chemical bond is for example a covalent, ionic bond or a hydrogen bond. Preferably said at least one polyhedral oligomeric silsesquioxane is bound to the polymer through at least one covalent and/or hydrogen bond.

At least one of the groups R or X, as defined above, of POSS is therefore chemically bound to the polymer.

In a first embodiment, the chemical bond between the polymer and the POSS in the layer of the pipe is a covalent bond. This chemical bond may notably be a bond of the ester, amide, amine, ether, thioether, urea, imine, imide, sulfonamide, carbamate, phosphate, siloxane (Si—O—Si), silane (Si—C) or carbon-carbon type. This embodiment is particularly preferred since the covalent bonds are generally the most stable chemical bonds.

In a second embodiment, the chemical bond between the polymer and the POSS in the layer of the pipe is a hydrogen bond. This chemical bond exists in the presence of at least one hydrogen bond donor and at least one hydrogen bond acceptor, one being on the POSS and the other one being on the polymer. The acceptor is notably a fluorine, nitrogen or oxygen atom and the donor is an acid H, typically such as an H atom born by an amine or an alcohol, but also an amide, a urea, a carbamate . . . .

In a third embodiment, the polymer and the POSS of the layer of the pipe are both bound through a covalent bond and a hydrogen bond.

The polymer of the layer of the flexible pipe is a polymer capable of chemically binding to the POSS, typically through hydrogen and/or covalent bonds. The polymer may comprise in its backbone, groups capable of chemically binding to the POSS. It may also comprise functional side chains. Functional side chains are for example side chains bearing COOH, $NH_2$, OH, epoxide, nitrile, anhydride or trialkoxysilane groups. The polymer is preferably an organic polymer (i.e. comprising carbon atoms), and in particular the backbone of which is organic.

In a first embodiment, the polymer of the layer of the flexible pipe is a polyamide optionally comprising functional side chains notably as defined above. The polyamides are advantageous since they may be used at high temperatures, generally above 100° C. The polyamide of the layer of the flexible underwater pipe may be a homopolyamide or a copolyamide, such as for example polyamide 6, polyamide 4.6, polyamide 6.6, polyamide 11, polyamide 12, polyamide 12.12, polyamide 10.12, polyamide 6.10, polyamide 6.12, polyamide 6.9, polyamide 9.9, polyamide 9T, polyamide 12T, polyamide 10T, polyamide 12I, polyamide 12T, polyamide 12T.12, polyamide 10T.12, polyamide 12T.106, polyamide 10T.106, polyamide 6.66, polyamide 6.612, polyamide 6.66.610, polyamide 6.66.12, polyamide 6.6T, polyamide 6T.6, polyamide 6T.12, polyamide 6T.6I, polyamide 6I.6T, polyamide 6.6I, polyamide 6T.66, polyamide 6T.66.12, polyamide 12.MACMI, polyamide 66.6I.6T, polyamide MXD6.6, MXD10, a polyphthalamide, polyarylamide, polyesteramide, polyetheresteramide, polyetheramide or mixtures thereof.

Preferably, the polyamide is selected from polyamide 11, polyamide 12, polyamide 6.12 and polyphthalamide.

When the polymer of the layer of the flexible pipe is a polyamide, the polyamide and the POSS of the layer of the pipe may be bound through a covalent bond and/or a hydrogen bond.

In a second embodiment, the polymer of the layer of the flexible pipe is a polyethylene optionally comprising functional side chains. Polyethylene polymers are of interest since they are not degraded by hydrolysis and are inexpensive. Functional side chains are for example side chains bearing COOH, $NH_2$, OH, epoxide, nitrile, anhydride or trialkoxysilane, preferably trialkoxysilane groups, notably function side chains bearing groups of formula —Si—$(OR_{10})(OR_{11})(OR_{12})$, wherein $R_{10}$, $R_{11}$ and $R_{12}$ are independently alkyl groups, preferably n-propyl, isopropyl, ethyl or methyl, more preferably methyl. For example, the polyethylene may comprise side chains of formula —$CH_2$—$CH_2$—Si—$(OR_{10})(OR_{11})(OR_{12})$, wherein $R_{10}$, $R_{11}$ and $R_{12}$ are as defined above, in particular side chains of formula —$CH_2$—$CH_2$—Si—$(OMe)_3$, which are more preferred since the Si—OMe functions are easily hydrolyzable into silanol functions Si—OH.

The polyethylene polymers comprising functional side chains are either commercial polymers or may be prepared by techniques known to one skilled in the art. For example, the polyethylene polymers comprising side chains of formula —$CH_2$—$CH_2$—Si—$(OR_{10})(OR_{11})(OR_{12})$ may be prepared by reaction between polyethylene and the vinyl silane derivative of formula CH=CH—Si—$(OR_{10})(OR_{11})(OR_{12})$ in the presence of peroxide (Sioplast process).

A flexible pipe comprising a layer comprising a polyethylene resin comprising at least one POSS chemically bound to the polyethylene may advantageously be used at higher temperatures than a flexible pipe comprising a layer comprising a polyethylene resin, and in particular at temperatures compatible with a use for transporting hydrocarbons.

When the polymer of the layer of the flexible pipe is a polyethylene optionally comprising functional side chains, the polyethylene and the POSS of the layer of the pipe are generally bound through a covalent bond.

In a third embodiment, the polymer of the layer of the flexible pipe is a homopolymer or copolymer of polyvinylidene fluoride optionally comprising functional side chains. A homopolymer or copolymer of polyvinylidene fluoride is notably a bearer of fluoride functions with which the POSS is capable of forming hydrogen bonds.

The layer comprising a polymeric resin comprising at least one POSS chemically bound to the polymer of the flexible underwater pipe may also comprise additives, such as antioxidants, plasticizers and any other fillers such as carbon black for example.

The layer comprising at least one layer comprising a polymeric resin comprising at least one POSS chemically bound to the polymer may notably be the sealing internal polymeric sheath in a flexible underwater pipe as defined above, but it may also be an intermediate layer located between two other layers.

In an embodiment, the flexible underwater pipe further comprises the following layers:

an external polymeric sheath, at least one tensile armor ply, optionally a pressure vault, and optionally a metal carcass.

According to a second object, the invention relates to a method for preparing the aforementioned flexible underwater pipe, comprising the following steps:

a) forming a polymeric resin comprising at least one polyhedral oligomeric silsesquioxane comprising the mixture of a polymer and of at least one polyhedral oligomeric silsesquioxane, for which at least one of the silicon atoms is substituted with a group capable of forming a hydrogen and/or covalent bond with said polymer, b) extruding in order to form a layer comprising said resin, c) assembling the layer obtained in step b) with at least one other layer.

The method generally comprises a subsequent step d) for cross-linking the assembly obtained during step c). This cross-linking is generally achieved by putting said assembly in the presence of water (or of humidity) at high temperatures, notably from 85 to 99° C., preferably from 95 to 98° C., for example by immersion in hot water or by circulation of hot water. The duration of the cross-linking step d) is variable, and notably depends on the thickness of the layer comprising the polymeric resin comprising POSS.

The polymer applied in the method is as defined above.

Said group capable of forming a hydrogen and/or covalent bond with said polymer is preferably selected from the R and/or X groups defined hereinbefore and capable of forming a hydrogen and/or covalent bond with said polymer, notably such that said R and/or X is(are) selected from a halogen, —SH, —OH, —$NH_2$, a group —$OSi(R_7)(R_8)(R_9)$, wherein $R_7$, $R_8$ and $R_9$ represent independently OH, an alkyl, an alkoxyl, or a group

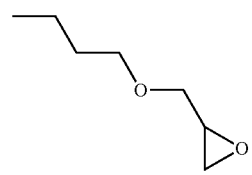

or a group —$OR_{17}$, wherein $R_{17}$ represents H or an alkyl, an unsaturated hydrocarbon chain (notably a vinyl group) or a saturated, unsaturated or aromatic, linear, branched or cyclic hydrocarbon chain, substituted with one or several groups selected from a halogen, or a group —OCOCl, —COCl, —$SO_2Cl$, —$COR_1$, —$CR_1R_2Cl$, —$OR_1$, —$OSi(R_7)(R_8)(R_9)$, —$SR_1$, —$NR_1R_2$, —$NR_1COR_2$, —$COR_1NR_2$, —$NR_1$—CO—$NR_2R_3$, —O—CO—$NR_1$, —$NR_1$—CO—$OR_2$, —CN, —$NO_2$, —NCO,

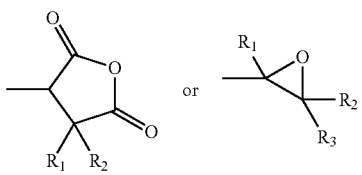

wherein $R_7$, $R_8$ and $R_9$ represent independently H or an alkyl and $R_1$, $R_2$ and $R_3$ represent independently H or a saturated, unsaturated or aromatic, linear, branched or cyclic hydrocarbon chain, itself optionally substituted with one or several of the groups selected from a halogen or a group —COCl, —OCOCl, —SO$_2$Cl, —COOR$_4$, —COR$_4$, —CR$_4$R$_5$Cl, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

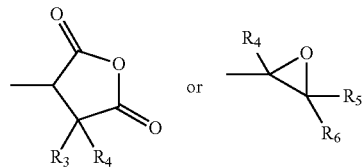

wherein $R_4$, $R_5$ and $R_6$ represent independently H or a saturated, unsaturated or aromatic, linear, branched or cyclic hydrocarbon chain.

In a first embodiment of the method, said groups R and/or X of the POSS capable of forming a covalent bond with the functions of the polymer is(are) selected from a halogen, —OH, —COOH, —NH$_2$, —SH, a —OSi(R$_7$)(R$_8$)(R$_9$) group, —OR$_{17}$, wherein R$_7$, R$_8$, R$_9$ and R$_{17}$ are as defined above or a saturated, unsaturated, aromatic, linear, branched or cyclic hydrocarbon chain substituted with one or several groups selected from a halogen or a group —COCl, —OCOCl, —SO$_2$Cl, —COOH, —CR$_1$R$_2$Cl, —OH, —SH, —NR$_1$H, —CN, —NCO,

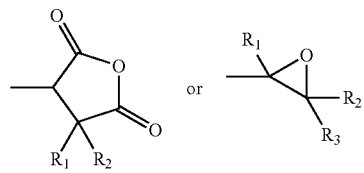

wherein $R_1$, $R_2$ et $R_3$ are as defined above.

Said more preferred R and/or X capable of forming a hydrogen and/or covalent bond with said polymer is(are) selected from:

a group —OH, —COOH or —NH$_2$, preferably —OH, a group —OR$_{17}$ wherein R$_{17}$ represents an alkyl, preferably a methyl, since the —Si—OMe group (the silicon stemming from the cage of the POSS) is advantageously easily hydrolyzable into a silanol Si—OH function, a group —OSi(R$_7$)(R$_8$)(R$_9$), preferably a group

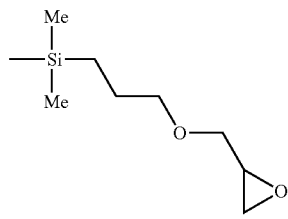

or a group —OSi(OMe)$_3$, for which the Si—OMe functions are advantageously easily hydrolyzable into a silanol Si—OH function, a vinyl group —CH=CH$_2$, a group of formula —(CH$_2$)$_3$—NH—(CO)—CH=CH—COOH.

Thus, in this first embodiment, during step a), at least one covalent bond is formed between the polymer and the POSS.

As an illustration, a substituent of the POSS bearing:

a halogen function may form an amine bond with an amine function of the polymer (by nucleophilic substitution) notably when the polymer is a polyamide, an alcohol function may form an ester bond with a carboxylic acid function of the polymer, notably when the polymer is a polyamide, a thiol function may form a thioester bond with a carboxylic acid function of the polymer, notably when the polymer is a polyamide, an epoxide function may form an ester bond with a carboxylic acid function of the polymer and/or an amine bond with an amine function of the polymer, notably when the polymer is a polyamide, an amine function may form an amide bond with a carboxylic acid function of the polymer, notably when the polymer is a polyamide, a carboxylic acid, acyl chloride or anhydride function may form an amide bond with an amine function of the polymer, notably when the polymer is a polyamide, an isocyanate function may form a urea bond with an amine function of the polymer, notably when the polymer is a polyamide, a chloroformate function may form a carbamate bond with an amine function of the polymer, notably when the polymer is a polyamide, a sulfonyl chloride function may form a sulfonamide bond with the amine function of the polymer, notably when the polymer is a polyamide, a hydroxyl function may form a siloxane bond with a trialkoxysilane group of the polymer, notably when the polymer is a polyethylene comprising side chains bearing trialkoxysilane groups, an alkoxyl function may form a siloxane bond with a trialkoxysilane group of the polymer, notably when the polymer is a polyethylene comprising side chains bearing trialkoxysilane groups, a function —OSi(R$_7$)(R$_8$)(R$_9$) wherein R$_7$, R$_8$ and R$_9$ represent independently OH or an alkoxyl may form a siloxane bond with a trialkoxysilane group of the polymer, notably when the polymer is a polyethylene comprising side chains bearing trialkoxysilane groups, a vinyl group may form a carbon-carbon bond with a polyethylene.

The POSSes of the following formulae (I), (II), (III), (IV), (V), (VII), (VIII), (IX), (X), (XI), (XII), (XIII) and (XIV) may for example be applied during step a) of the first embodiment:

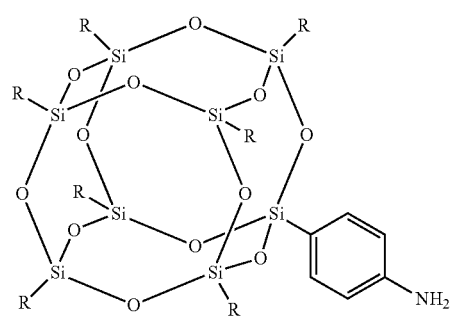
(I)
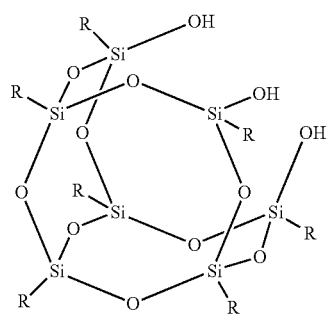
(II)
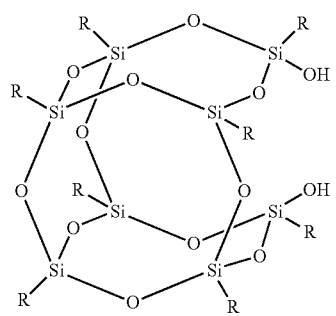
(III)
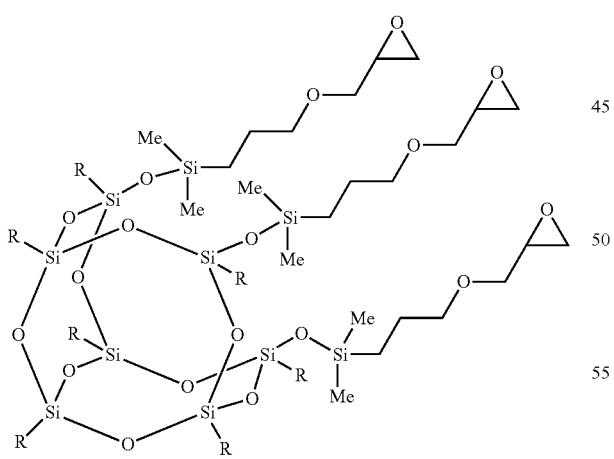
(IV)
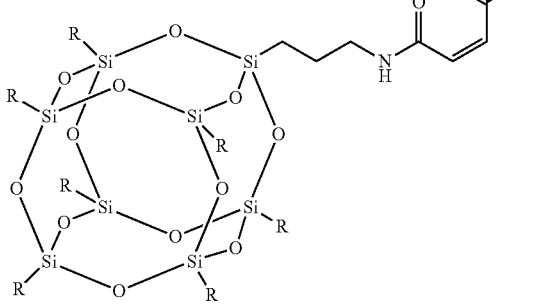
(V)
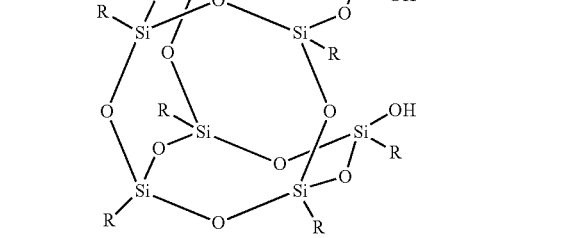
(VII)
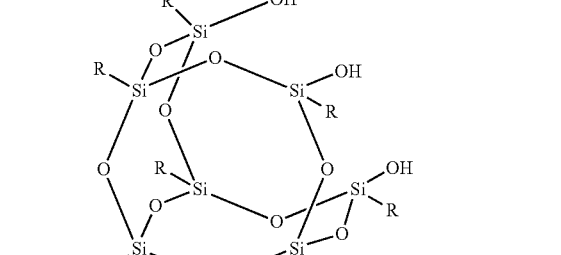
(VIII)
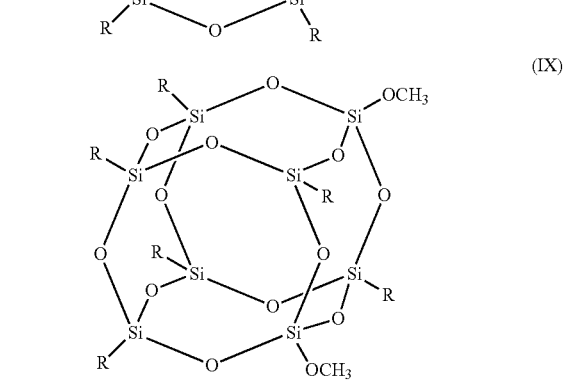
(IX)
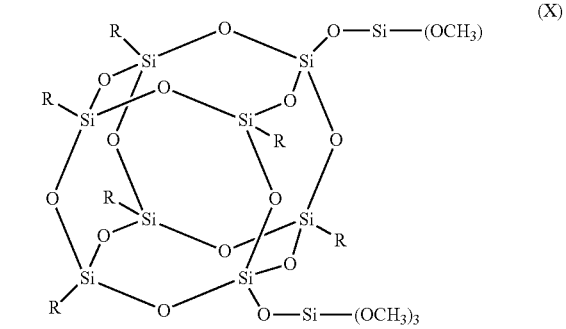
(X)

-continued

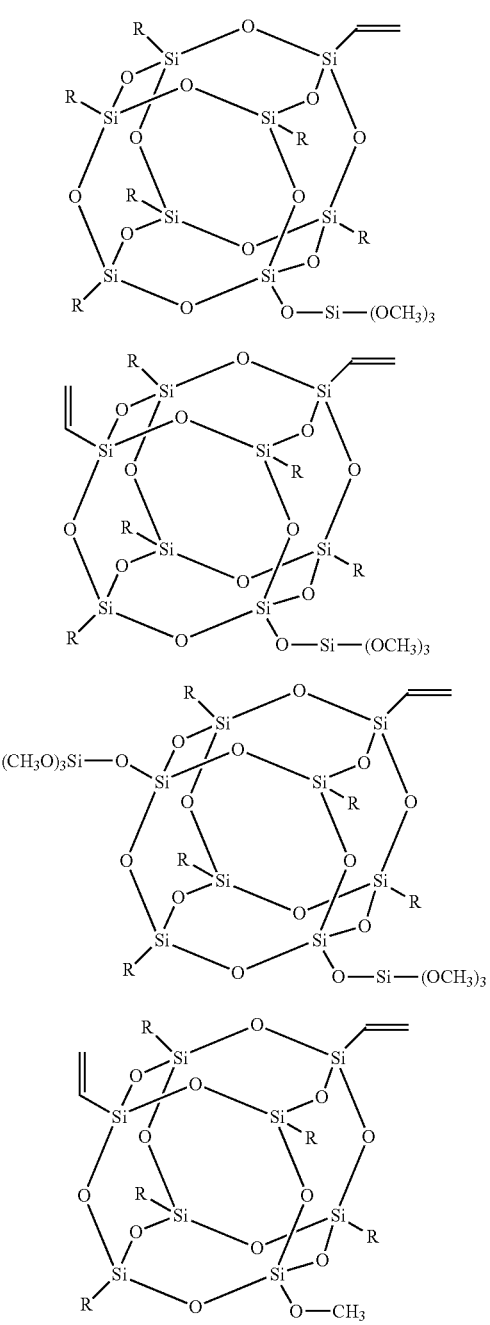

(XI)

(XII)

(XIII)

(XIV)

wherein R represents a saturated, unsaturated or aromatic, linear, branched or cyclic hydrocarbon group or a group as defined for R and/or X in the first embodiment of the method.

Preferably, in the aforementioned formula (I), R represents

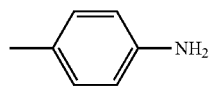

and in the aforementioned formulae (II), (III), (IV) and (V), R represents an alkyl, for example an isobutyl group, these POSSes are advantageously commercially available.

The compounds of formula (VII) and (VIII) are commercially available.

Preferably, when the polymer is a polyamide optionally comprising side chains, the POSSes of formulae (I), (II), (III), (IV) or (V) are applied during step a).

Preferably, when the polymer is a polyethylene comprising side chains bearing trialkoxysilane groups, notably comprising a group —Si—$(OR_{10})(OR_{11})(OR_{12})$, wherein $R_{10}$, $R_{11}$ and $R_{12}$ are as defined above, in particular side chains of formula —$CH_2$—$CH_2$—Si—$(OR_{10})(OR_{11})(OR_{12})$, wherein $R_{10}$, $R_{11}$ and $R_{12}$ are as defined above, the POSSes of formulae (VII), (VIII), (IX) or (X) are applied during step a).

Preferably, when the polymer is a polyethylene, the POSSes of formulae (XI), (XII), (XIII) or (XIV) are applied during step a).

POSSes for which at least one of the silicon atoms is substituted with a substituent bearing a group capable of forming a covalent bond with a polymer, and in particular bearing one of the aforementioned groups, may notably be prepared by following the methods described in the international application WO 01/10871.

The mixing of step a) may notably be achieved by mixing the polymer in the molten state (<<melt mixing>>), by compounding, extrusion, reaction extrusion (i.e. by performing steps a) and b) simultaneously). Except when step a) is performed by reactive extrusion, the mixture of step a) may be used either as a master mixture or as a main matrix for forming the layer comprising the polymeric resin.

Generally, in step a) of the method when the mixture of the polymer and of the POSS forms the main matrix, 1 to 10% by weight, preferably 1 to 5% by weight, of POSS are used based on the total weight of the mixture. When the mixture of the polymer and of the POSS is used as a master mixture, the POSS mass percentage in the polymeric resin may attain 30% or even 50%.

During step a) of the method, additives may be added, in particular the aforementioned ones.

In this first embodiment, the method may comprise a chemical coupling step for forming a covalent bond between said group and the functions of the polymer, for example by hydrolysis or a radical reaction.

This chemical coupling step may for example be a hydrolysis, notably an acid hydrolysis. For example:
  if the polymer is a polyethylene comprising side chains bearing a trialkoxysilane group, preferably of formula —$CH_2$—$CH_2$—Si—$(OR_{10})(OR_{11})(OR_{12})$, with hydrolysis, it is possible to hydrolyze the trialkoxysilane group into a silanol group, capable of binding to at least one hydroxyl group borne by a POSS with formation of a siloxane bond (Si—O—Si),
  if the polymer is a polyethylene comprising side chains bearing a trialkoxysilane group, preferably of formula —$CH_2$—$CH_2$—Si—$(OR_{10})(OR_{11})(OR_{12})$, with hydrolysis, it is possible to hydrolyze the trialkoxysilane group into a silanol group and if the POSS comprises at least one trialkoxysilane group hydrolyzable into a silanol group, the thereby formed silanol groups on the POSS and the polymer may fuse together with formation of a siloxane bond,
  if the polymer is a polyethylene comprising side chains bearing a trialkoxysilane group, preferably of formula —$CH_2$—$CH_2$—Si—$(OR_{10})(OR_{11})(OR_{12})$, with hydrolysis it is possible to hydrolyze the trialkoxysilane group into a silanol group and if the POSS comprises at least one alkoxyl group hydrolyzable into a silanol group (the alkoxyl group being borne by a silicon atom of the cage of the POSS), the silanol groups on the POSS and the polymer may fuse together with formation of a siloxane bond.

The polymer may also be prepared during step a). For example, when the polymer is a polyethylene polymer comprising side chains of formula —CH$_2$—CH$_2$—Si—(OR$_{10}$)(OR$_{11}$)(OR$_{12}$) wherein R$_{10}$, R$_{11}$ and R$_{12}$ are as defined above, the step a) may comprise the following steps:

a$_1$) melting a polyethylene polymer, a$_2$) adding a vinylsilane derivative of formula CH=CH—Si—(OR$_{10}$)(OR$_{11}$)(OR$_{12}$), a peroxide initiator and at least one polyhedral oligomeric silsequioxane, for which at least one of the silicon atoms is substituted with a hydroxyl, trialkoxysilane or alkoxyl group in order to obtain a polyethylene comprising functional side chains, a$_3$) mixing with polyethylene, a catalyst for the cross-linking reaction, an antioxidant and a stabilizer, it being understood that steps a$_2$, a$_3$ and b) may be carried out simultaneously.

The peroxide initiator may notably be dicumyl peroxide or 1,1-(t-butylperoxy) 3,3,5-trimethylcyclohexane (Lupersol L231).

The catalyst of the cross-linking reaction may notably be dibutyl tin laurate (DBTL) or dioctyl tin laurate (DOTL).

The antioxidant may notably be a hindered phenolic compound such as Irganox® (Ciba-BASF) or Hostanox® (Clariant) compounds.

The stabilizer may notably be a hindered amine light stabilizer (HALS), such as Chimassorb®, Tinuvin® or Irgastab® (Ciba-BASF).

The mixture of polyethylene, of the catalyst of the cross-linking reaction, of the antioxidant and of the stabilizer is a master mixture for the polyethylene comprising side chains of formula —CH$_2$—CH$_2$—Si—(OR$_{10}$)(OR$_{11}$)(OR$_{12}$).

The POSSes bearing at least one hydroxyl, trialkoxysilane or alkoxyl group are added during step a$_2$, simultaneously or separately with the vinylsilane derivative. Indeed, it is generally preferred to avoid adding POSS during step a$_3$) in order to avoid a chemical reaction between the cross-linking reaction catalyst and the POSS and therefore their degradations.

The steps a$_1$), a$_2$) and a$_3$) are then followed by step b) (extrusion), c) (assembly with other layers) and d) (cross-linking) as defined above.

Step d) then comprises the aforementioned hydrolysis step allowing formation of the siloxane bonds.

The chemical coupling step may also be a radical reaction. For example, if the polymer is a polyethylene and if the POSS bears at least one vinyl group, the POSS may be grafted to the polyethylene by a radical reaction and with formation of carbon-carbon bonds.

Step a) then comprises the steps a$_1$, a$_{2bis}$ and a$_{3bis}$ and the method comprises the following steps:

a$_1$) melting a polyethylene polymer, a$_{2bis}$) adding to the molten polyethylene polymer, a peroxide initiator and at least one polyhedral oligomeric silsesquioxane, for which at least one of the silicon atoms is substituted with a hydroxyl, trialkoxysilane or alkoxyl group in order to obtain a premix, a$_{3bis}$) mixing with polyethylene, a catalyst for the cross-linking reaction, an antioxidant and a stabilizer, b) extruding for forming a layer comprising said resin, c) assembling the layer obtained in step b) with at least one other layer, d) cross-linking the assembly obtained at the end of step c), it being understood that steps a$_{2bis}$, a$_{3bis}$ and b) may be carried out simultaneously. For example the POSS may be added during the extrusion through a side feeder on the extruder.

The peroxide initiator, the catalyst for the cross-linking reaction, the antioxidant, the stabilizer may notably be those defined above.

The cross-linking of step d) is generally carried out under the same conditions as defined above. Step d) then comprises the aforementioned radical reaction step allowing the formation of carbon-carbon bonds between the vinyl group of the POSS and polyethylene. If the POSS comprises, in addition to the vinyl function, a group —OSi(R$_7$)(R$_8$)(R$_9$), step d) further comprises a hydrolysis step allowing the formation of siloxane bonds.

A different method may be applied when the polymer is a polyethylene and the POSS bears at least one vinyl group, wherein the polyethylene polymer is prepared during the method. The method then comprises a step for polymerization of ethylene and POSS bears at least one vinyl group. This method is however more complex to apply than the method comprising the steps a$_1$), a$_{2bis}$), a$_{3bis}$), b), c) and d) as defined above.

The following embodiments are preferred when the polymer is polyethylene:

the POSS bears at least one vinyl group, notably two vinyl groups, the POSS bears at least one vinyl group and a siloxane group (preferably of formula —OSi(R$_7$)(R$_8$)(R$_9$) wherein R$_7$, R$_8$ and R$_9$ are as defined above), notably bearing two vinyl groups and a siloxane group or bearing a vinyl group and two siloxane groups, the POSS bears at least one vinyl group and an alkoxyl group, notably two vinyl groups and one alkoxyl group.

The chemical coupling step may be catalyzed, notably by heat, radiation and/or a catalyst.

For example, if the polymer bears a carboxylic acid function, the esterification reaction between the hydroxyl function of a POSS, for which at least one of the silicon atoms is substituted with a substituent bearing a hydroxyl group and the carboxylic acid function of a polymer may be catalyzed by a base. It is within the skill of one skilled in the art to adapt the chemical coupling conditions (temperature, pressure, use of a catalyst, reaction time) in order to allow generation of the covalent bond.

In another example, the aforementioned steps for hydrolysis of alkoxysilane or trialkoxysilane silane groups into silanol groups when the POSS bears at least one trialkoxysilane or alkoxyl group and/or the polymer comprises trialkoxysilane groups, may be catalyzed with an acid. Also, the condensation step between the POSS and the polymer in order to form a siloxane bond may be catalyzed with an acid, or even with an acid and with heat.

When the POSS has only one silicon atom bearing a substituent R or X capable of forming a covalent bond, a polymer comprising a modified functional group, the molecular mass of which is increased, is obtained.

When the POSS has two silicon atoms bearing a substituent R or X capable of forming a covalent bond, the POSS may react with two distinct polymer chains, which allows an increase in the molecular mass of the obtained polymer.

When the POSS has more than three silicon atoms bearing a substituent R or X capable of forming a covalent bond, the POSS may react with three distinct polymer chains, which allows an increase in the molecular mass of the obtained polymer and in the generation of cross-linking points.

The larger is the number of silicon atoms of the POSS substituted with a substituent R or X capable of forming a covalent bond, the more the molecular mass of the polymer increases. Preferably POSSes comprising at least two silicon atoms substituted with a group capable of forming a covalent bond are used during step a). More preferably, POSSes comprising at least three silicon atoms substituted with a group capable of forming a covalent bond are used during step a). POSSes comprising as many substituents R and/or X capable of forming a covalent bond as there are silicon atoms, may be used, when each silicon atom of the POSS bears a group capable of forming a covalent bond. Generally, POSSes comprising less than four silicon atoms substituted with one or more groups R and/or X capable of forming a covalent bond are used during step a).

By increasing the molecular mass and/or the number of cross-linking points, it is possible to reduce the mobility of the chains of polymers relatively to each other and thereby obtain a polymer having improved thermomechanical properties. A flexible underwater pipe comprising such a polymer is therefore adapted so as to be used for transporting fluids under high pressure and at a high temperature.

In a second embodiment of the method, said group(s) R and/or X capable of forming a hydrogen bond is(are) selected from —OH, —NH$_2$, —SH, —OR$_{17}$, a saturated, unsaturated or aromatic, linear, branched or cyclic hydrocarbon chain, substituted with one or more groups selected from a group —F, —COOR$_1$, —OR$_1$, —SR$_1$, —NR$_1$R$_2$, —NR$_1$COR$_2$, —COR$_1$NR$_2$, —NR$_1$, —CO—NR$_2$R$_3$, —CN, —NO$_2$ wherein R$_1$, R$_2$ and R$_{17}$ are as defined above, with the polymer. Thus, during step a), at least one hydrogen bond is formed between the polymer and the POSS.

The POSSes of the following formulae (I), (II), (III) and (VI) may for example be applied during step a) of the second embodiment:

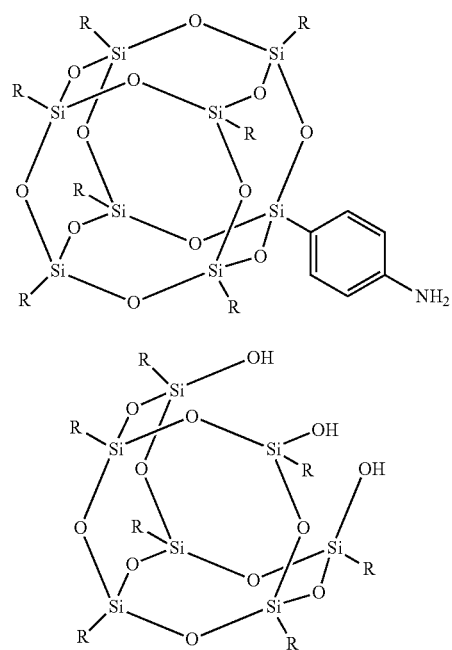

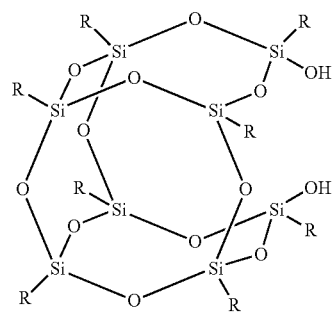

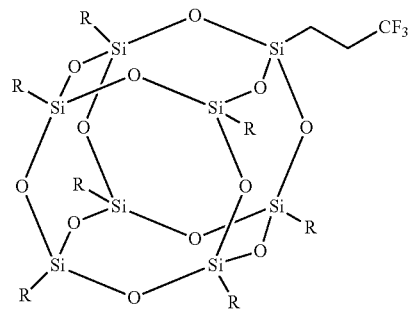

wherein R represents a saturated, unsaturated or aromatic, linear, branched or cyclic hydrocarbon chain or a group as defined for R and/or X in the second embodiment of the method.

Preferably, in the aforementioned formula (I), R represents

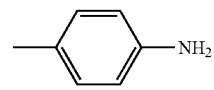

and in the aforementioned formulae (II), (III) and (VI), R represents an isobutyl group. These POSSes are advantageously commercially available.

These POSSes indeed have at least one of the silicon atoms, substituted with a substituent bearing a group capable of forming a hydrogen bond, as illustrated in the following diagram:

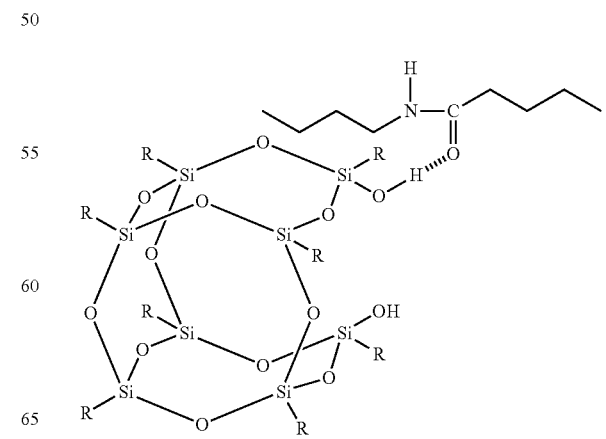

-continued

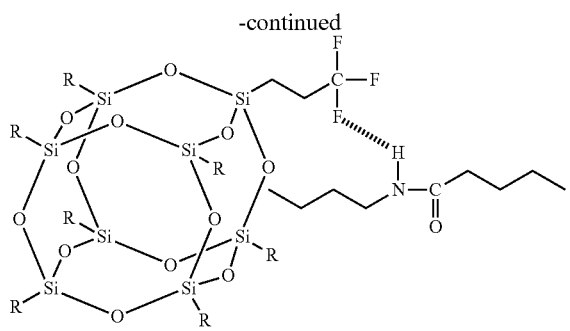

There again, POSSes, for which at least one of the silicon atoms bears a substituent R capable of forming a hydrogen bond with a polymer, and in particular bearing one of the aforementioned functions, may notably be prepared by following the methods described in international application WO 01/10871.

This second embodiment is particularly adapted when the polymer is a polyamide optionally comprising functional side chains.

When a crystalline polymer is applied for carrying out step a) of the method, for example a polyamide 11, a polyamide 12 or a polyamide 6.12, generally the layer obtained at the end of step b) also has a crystalline nature. The presence of POSS in the polymeric resins does not affect the crystalline nature of the obtained layer.

The extrusion step b) may be carried out by any method known to one skilled in the art.

Generally, the resin obtained at the end of step a) is dried, typically in an oven at a temperature of more than 70° C., generally for several hours, for examples four hours at 80° C., before feeding a single screw, a twin screw extruder, a reactive extruder (and in this case, steps a) and b) are simultaneous since the mixing between the POSS and the polymer and the extrusion are accomplished in the same tooling) or a co-extruder allowing a layer to be made, comprising a polymeric resin comprising at least one POSS chemically bound to the polymer.

The layer comprising the resin obtained at the end of step b) is typically tubular, generally has a diameter from 50 mm to 600 mm, preferably from 50 to 400 mm, a thickness from 1 mm to 150 mm, preferentially from 40 to 100 mm and a length from 1 m to 10 km.

The method comprises step c) for assembling the layer obtained during step b) with at least one other layer in order to form the flexible underwater pipe, notably with an external polymeric sheath, a tensile armor ply, optionally a pressure vault, and optionally a metal carcass.

In an embodiment, the extrusion of the mixture obtained in step a) is accomplished on another layer, typically the carcass, in order to obtain an assembly (carcass/layer in polymeric resin comprising at least one POSS chemically bound to the polymer) which will then be added and calendered with at least one other layer during step c), typically a pressure vault, tensile armor plies and an external polymeric sheath. This embodiment notably allows the making of rough bore flexible pipes.

According to another embodiment, the extrusion of the mixture obtained in step a) is independent and the layer obtained at the end of step b) is then added and calendered with at least one other layer during step c), typically a pressure vault, tensile armor plies and an external polymeric sheath. This embodiment notably allows the making of smooth bore flexible pipes.

The layers are assembled so as to form a flexible underwater pipe of the unbonded type, as described in the normative documents published by the American Petroleum Institute (API), API 17J and API RP 17B.

According to a third object, the object of the invention is a flexible underwater pipe which may be obtained by the aforementioned method.

The presence of POSS chemically bound to the polymer in a polymeric resin used as a layer of the flexible underwater pipe according to the invention has, in addition to improvements in the thermomechanical properties of the resin, the following advantages:

the thermomechanical properties of the resin may be adapted depending on the percentage of POSS introduced into the resin and on the POSS used, more particularly depending on the nature of R and/or X and therefore on the nature of the bond with the polymer (covalent or hydrogen bond and nature of the covalent bond (ester, amide, sulfonamide, ... )), on the number of R and/or X substituents of the POSS capable of forming a chemical bond with the polymer, the resin is homogeneous since the POSSes are miscible in polymeric resins by selecting the R and X groups, the resin may be obtained by using conventional devices and techniques for mixing and extruding, the cage structure comprising silicon and oxygen atoms of the POSSes is chemically stable over time, the water uptake of the resin is reduced since the POSSes make the resin more hydrophobic, swelling of the resin is reduced, the elongation at break of the resin is increased while maintaining the modulus, the impact resistance and the permeation.

These advantages allow the use of the flexible underwater pipe for transporting fluids. Thus, according to a fourth object, the object of the invention is the use of the aforementioned flexible underwater pipe for transporting fluids, notably gases or liquids, preferably hydrocarbons.

BRIEF DESCRIPTION OF THE DRAWINGS

Other particularities and advantages of the invention will become apparent upon reading the description made hereafter of particular embodiments of the invention, given as an indication but not as a limitation, with reference to the FIGURE.

The FIGURE is a schematic partial perspective view of a flexible pipe according to the invention.

DESCRIPTION OF PREFERRED EMBODIMENTS

FIG. 1 illustrates a pipe according to the invention comprising, from the outside towards the inside:

a so-called sealing external polymeric sheath 10 (called an external sheath), an external tensile armor ply 12, an internal tensile armor ply 14 wound in the direction opposite to that of the external ply 12, a pressure vault 18 for spreading out the radial forces generated by the pressure of the transported fluid, a so-called sealing internal polymeric sheath 20 comprising a polymeric resin comprising at least one POSS according to the invention, and an internal carcass 22 for spreading out the radial crushing forces.

Because of the presence of the internal carcass 22, said pipe is said to be with a rough bore. The invention may also be applied to a pipe said to have a smooth bore, not comprising any internal carcass.

Also, there would be no departure from the scope of the present invention by suppressing the pressure vault 18, provided that the helix angles of the wires forming the armor plies 12, 14 are close to 55° and in the opposite direction.

The armor plies 12, 14 are obtained by winding with a long pitch an assembly of wires in a metal or composite material, with a generally substantially rectangular section. The invention would also apply if these wires had a section with circular or complex geometry, for example of the self-stapled T type. In FIG. 1, only two armor plies 12 and 14 are illustrated, but the pipe may also comprise one or several additional pairs of armors. The armor ply 12 is said to be external since here it is the last, starting from the inside of the pipe, before the external sealing sheath 10.

The flexible pipe may also comprise layers not shown in FIG. 1, such as:
  a holding layer between the external polymeric sheath 10 and the tensile armor plies 12 and 14, or between two tensile armor plies,
  one or several anti-wear layers in a polymeric material in contact either with the internal face of the aforementioned holding layer, or with its external face, or with both faces, this anti-wear layer giving the possibility of avoiding the wear of the holding layer in contact with metal armors. The anti-wear layers, which are well known to one skilled in the art, are generally made by a helicoidal winding of one or several strips obtained by extrusion of a polymeric material based on polyamide, on polyolefins, or on PVDF (polyvinylidene fluoride). It is also possible to refer to document WO2006/120320 which describes anti-wear layers consisting of strips in polysulfone (PSU), polyethersulfone (PES), polyphenylsulfone (PPSU), polyetherimide (PEI), polytetrafluoroethylene (PTFE), polyetheretherketone (PEEK) or polyphenylene sulfide (PPS).

What is claimed is:

1. A flexible underwater pipe intended for transporting fluids, notably hydrocarbons, comprising at least one layer comprising a polymeric resin comprising at least one polyhedral oligomeric silsesquioxane chemically bound to the polymer.

2. The flexible underwater pipe according to claim 1, wherein the polymer and said at least one polyhedral oligomeric silsesquioxane are bound through a covalent bond.

3. The flexible underwater pipe according to claim 1 or 2, wherein the polymer and said at least one polyhedral oligomeric silsesquioxane are bound through a bond of the ester, amide, amine, thioether, ether, urea, imide, imine, sulfonamide, carbamate or phosphate type.

4. The flexible underwater pipe according to claim 1, wherein the polymer and the polyhedral oligomeric silsesquioxane are bound through a hydrogen bond.

5. The flexible underwater pipe according to claim 1, wherein the polymer is a polyamide.

6. The flexible underwater pipe according to claim 1, further comprising the following layers:
  an external polymeric sheath,
  at least one tensile armor ply,
  optionally a pressure vault, and/or
  optionally a metal carcass.

7. A method for preparing a flexible underwater pipe according to claim 1, comprising the following steps:
  a) forming a polymeric resin comprising at least one polyhedral oligomeric silsesquioxane chemically bound to the polymer, comprising the mixing of a polymer and of at least one polyhedral oligomeric silsesquioxane, for which at least one of the silicon atoms is substituted with a group R and/or X capable of forming a hydrogen and/or covalent bond with a polymer;
  b) extruding the mixture obtained in step a) in order to form a layer comprising said resin; and
  c) assembling the layer obtained in step b) with at least one other layer.

8. The method according to claim 7, wherein said group(s) R and/or X is(are) selected from a halogen, —OH, —NH$_2$, —SH, a saturated, unsaturated or aromatic, linear, branched or cyclic hydrocarbon chain, substituted with one or several groups selected from a halogen or a group COCl, —OCOCl, —SO$_2$Cl, —COOR$_1$, —COR$_1$, —CR$_1$R$_2$Cl, —OR$_1$, —SR$_1$, —NR$_1$R$_2$, —NR$_1$—COR$_2$, —COR$_1$NR$_2$, —NR$_1$—CO—NR$_2$R$_3$, —O—CO—NR$_1$—NR$_1$—CO—OR$_2$, —CN, —NO$_2$, —NCO

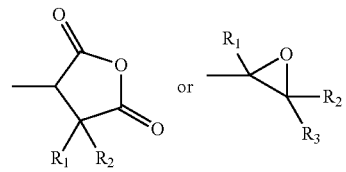

wherein R$_1$, R$_2$ and R$_3$ represent independently H or a saturated, unsaturated or aromatic, linear, branched or cyclic hydrocarbon chain, itself optionally substituted with one or several of the groups selected from a halogen or a group —COCl, —OCOCl, —COOR$_4$, —COR$_4$, —CR$_4$R$_5$Cl, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO

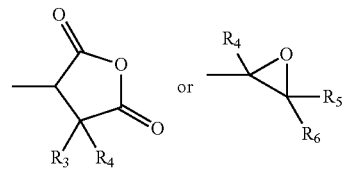

wherein R$_4$, R$_5$ and R$_6$ represent independently H or a saturated, unsaturated or aromatic, linear, branched or cyclic hydrocarbon chain.

9. The method according to claim 7, wherein said group(s) R and/or X is(are) capable of forming a covalent bond and is(are) selected from a halogen, —OH, —NH$_2$, —SH, a saturated, unsaturated or aromatic, linear, branched or cyclic hydrocarbon chain, substituted with one or several groups selected from a halogen or a group —COCl, —OCOCl, —SO$_2$Cl, —CR$_1$R$_2$Cl, —COOH, —OH, —SH, —NR$_1$H, —CN, —NCO,

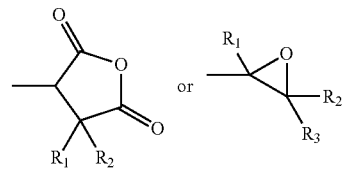

wherein $R_1$, $R_2$ and $R_3$ represent independently H or a saturated, unsaturated or aromatic, linear, branched or cyclic hydrocarbon chain, itself optionally substituted with one or several of the groups selected from a halogen or a group —COCl, —OCOCl, —COOR$_4$, —COR$_4$, —CR$_4$R$_5$Cl, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

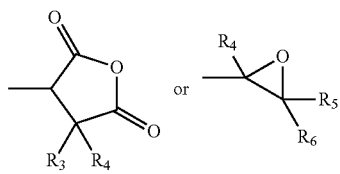

wherein $R_4$, $R_5$ and $R_6$ represent independently H or a saturated, unsaturated or aromatic, linear, branched or cyclic hydrocarbon chain.

10. The method according to claim 7, wherein one of the polyhedral oligomeric silsesquioxanes of following formulae (I), (II), (III), (IV) or (V) is applied during step a):

(I)

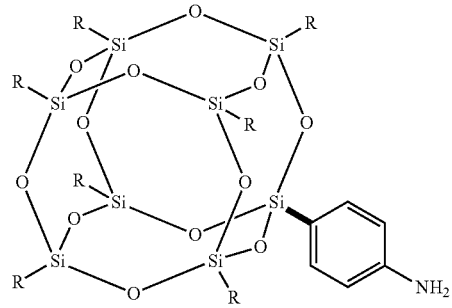

(II)

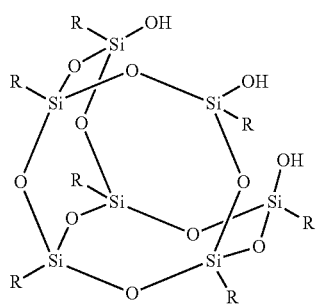

(III)

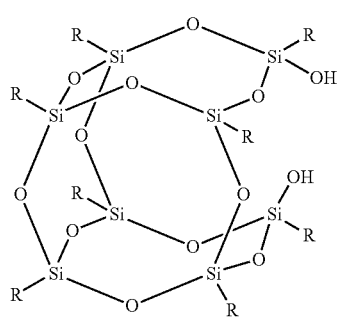

(IV)

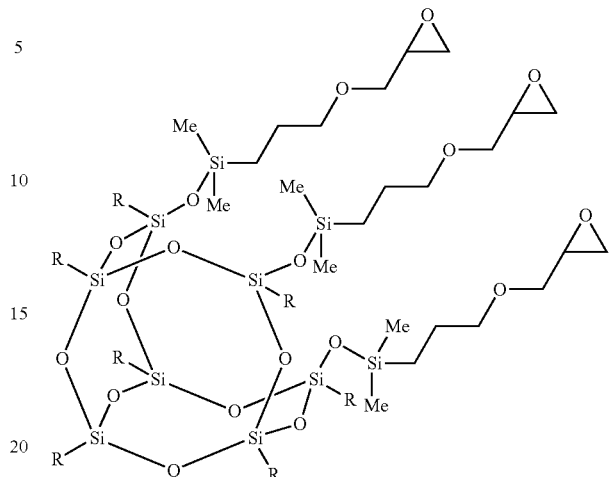

(V)

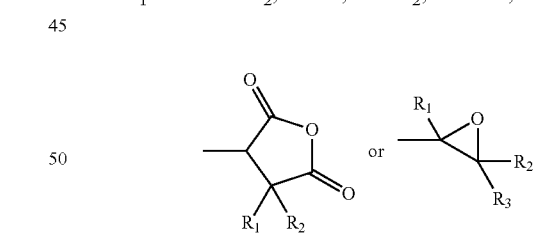

wherein R represents a saturated, unsaturated or aromatic, linear, branched or cyclic hydrocarbon chain or a group COCl, —OCOCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

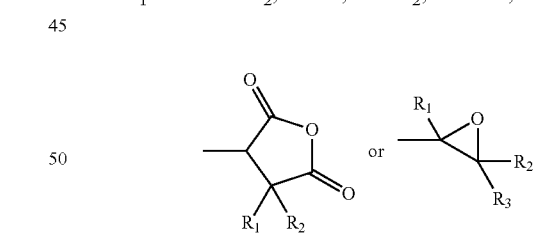

wherein $R_1$, $R_2$ and $R_3$ represent independently H or a saturated, unsaturated or aromatic, linear, branched or cyclic hydrocarbon chain, itself optionally substituted with one or several of the groups selected from a halogen or a group —COCl, —OCOCl, —COOR$_4$, —COR$_4$, —CR$_4$R$_5$Cl, —OR$_4$—SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

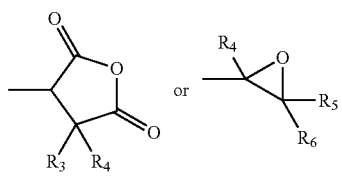

wherein $R_4$, $R_5$ and $R_6$ represent independently H or a saturated, unsaturated or aromatic, linear, branched or cyclic hydrocarbon chain.

11. The method according to claim 7, comprising a chemical coupling step for forming a covalent bond between said group and the functions of a polymer.

12. The method according to claim 11, wherein the chemical coupling is catalyzed by heat, radiations or a catalyst.

13. The method according to claim 7, wherein said groups R and/or X is(are) capable of forming a hydrogen bond and is(are) selected from —OH, —NH$_2$, —SH, a saturated, unsaturated or aromatic, linear, branched or cyclic hydrocarbon chain, substituted with one or several groups selected from a group —F, —COOR$_1$, —COR$_1$, —OR', —SR$_1$, —NR$_1$R$_2$, —NR$_1$COR$_2$, —COR$_1$NR$_2$, —NR$_1$—CO—NR$_2$R$_3$, —O—CO—NR$_1$,—NR$_1$—CO—OR$_2$, —CN, —NO$_2$ wherein R$_1$ and R$_2$ represent independently H or a saturated, unsaturated or aromatic, linear, branched or cyclic hydrocarbon chain, itself optionally substituted with one or several of the groups selected from a halogen or a group —COCl, —OCOCl, —COOR$_4$, —COR$_4$, —CR$_4$R$_5$Cl, —OR$_4$—SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

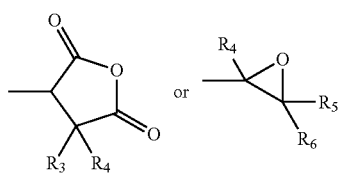

wherein $R_4$, $R_5$ and $R_6$ represent independently H or a saturated, unsaturated or aromatic, linear, branched or cyclic hydrocarbon chain.

14. The method according to claim 13, wherein one of the polyhedral oligomeric silsesquioxanes are the following formulae (I), (II), (III) and (VI) is applied during step a):

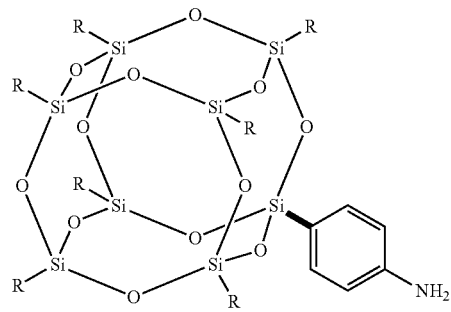

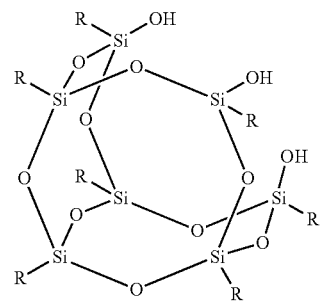

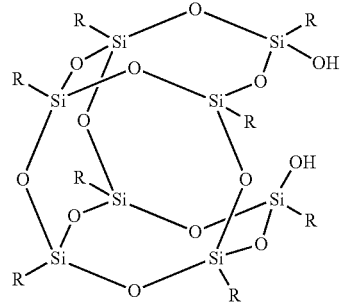

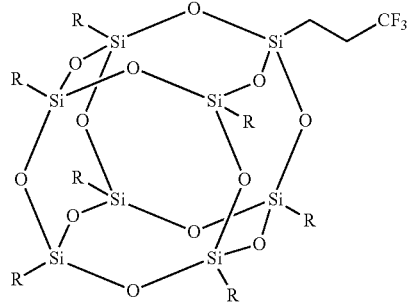

wherein R represents a saturated, unsaturated or aromatic, linear, branched or cyclic hydrocarbon chain or a group COCl, —OCOCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

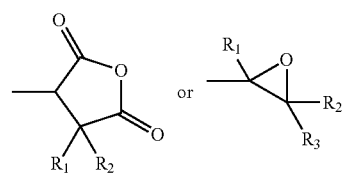

wherein $R_1$, $R_2$ and $R_9$ represent independently H or a saturated, unsaturated or aromatic, linear, branched or cyclic hydrocarbon chain, itself optionally substituted with one or several of the groups selected from a halogen or a group —COCl, —OCOCl, —COOR$_4$, —COR$_4$, —CR$_4$R$_5$Cl, —OR$_4$—SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

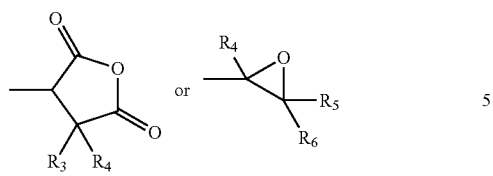
wherein $R_4$, $R_5$ and $R_6$ represent independently H or a saturated, unsaturated or aromatic, linear, branched or cyclic hydrocarbon chain.
15. A flexible underwater pipe which may be obtained by a method according to claim 7.
16. A method for transporting fluids, notably gases or liquids, preferably hydrocarbons by use of a flexible underwater pipe according to claim 1.
* * * * *